United States Patent [19]
Jetzinger

[11] Patent Number: 5,175,985
[45] Date of Patent: Jan. 5, 1993

[54] TOOLHOLDER FOR USE IN A ROTARY CROP-CUTTING MACHINE

[76] Inventor: Franz Jetzinger, Schindau 31, A-3364 Neuhofen, Austria

[21] Appl. No.: 790,475

[22] Filed: Nov. 12, 1991

[30] Foreign Application Priority Data

Nov. 16, 1990 [AT] Austria .................................. 2318/90

[51] Int. Cl.$^5$ .............................................. B21K 11/00
[52] U.S. Cl. .......................................... 56/1; 76/82.1
[58] Field of Search .......................... 56/1, 229, 289; 29/DIG. 104, DIG. 105; 76/82, 82.1

[56] References Cited

U.S. PATENT DOCUMENTS

| | | | |
|---|---|---|---|
| 2,371,492 | 3/1945 | Wulff | 76/82.1 |
| 5,062,322 | 11/1991 | Sinko | 76/82.1 |

FOREIGN PATENT DOCUMENTS

| | | |
|---|---|---|
| 395624 | 10/1990 | European Pat. Off. |
| 2920244 | 11/1980 | Fed. Rep. of Germany |
| 1520653 | 3/1968 | France |

Primary Examiner—Thuy M. Bui
Attorney, Agent, or Firm—Collard & Roe

[57] ABSTRACT

A toolholder for use in a rotary crop-cutting machine, such as a mowing or chopping machine, comprises a rotatable tool carrier, to which the tools are adapted to be pivoted on pins, which are parallel to the axis of rotation of the tool carrier. Each of said pins carries at least one tool and at opposite ends is radially slidably mounted in axially aligned slots, which extend radially with respect to the axis of rotation and are formed in two axially spaced apart lugs, which are secured to and substantially radially protrude from the body of the tool carrier, or in two axially spaced apart disks, which constitute the tool carrier. Each of said slots has a radially outer portion for retaining the associated pin against axial displacement in said radially outer portion. In order to ensure that a detaching of the tools will reliably be prevented even if the lugs or disks are very thin, each of the two axially spaced apart and axially aligned slots of each pair has a constricted radially outer portion, each end portion of each pin has a diameter that corresponds to the unconstricted width of the slot, the constriction is defined merely by projections, which are formed on the side faces of each slot on that side which is nearer to the other slot of the same pair, and the pins are formed with recessed portions for receiving said projections.

10 Claims, 2 Drawing Sheets

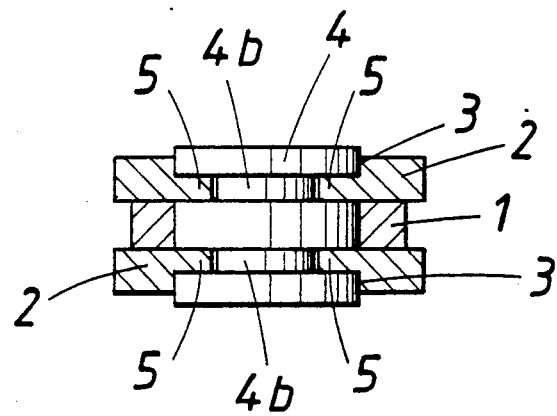
FIG.4
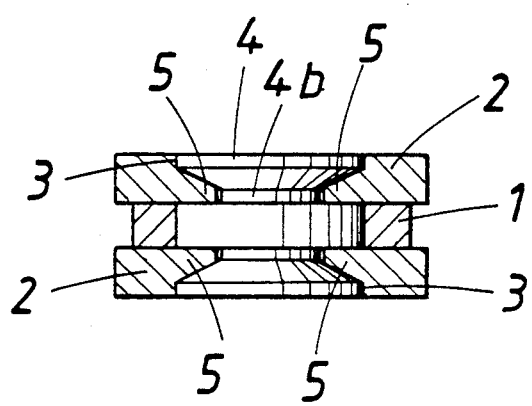
FIG.5
FIG.6
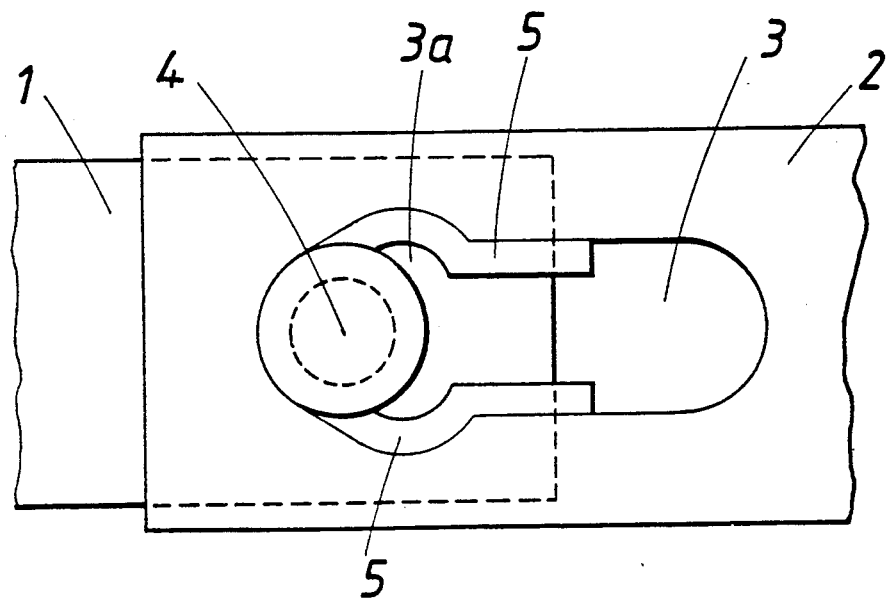

TOOLHOLDER FOR USE IN A ROTARY CROP-CUTTING MACHINE

BACKGROUND OF THE INVENTION

1. Field of the Invention

This invention relates to a toolholder for use in a rotary crop-cutting machine, such as a mowing or chopping machine, which toolholder comprises a rotatable tool carrier, to which the tools are adapted to be pivoted on pins, which are parallel to the axis of rotation of the tool carrier, wherein each of said pins carries at least one tool and at opposite ends is radially slidably mounted in axially aligned slots, which extend radially with respect to the axis of rotation and are formed in two axially spaced apart lugs, which are secured to and substantially radially protrude from the body of the tool carrier, or in two axially spaced apart disks, which constitute the tool carrier, and wherein each of said slots has a radially outer portion for retaining the associated pin against axial displacement in said radially outer portion.

2. Description of the Prior Art

Because the tools are pivotally movable, they can yield when they strike against a hard object, such as a stone, during the rotation of the tool carrier so that substantial damage to the tools will be prevented. Obviously the pins are radially slidable in the slots so that under the action of centrifugal force the pins will move to the radially outer end of the slots, where they are retained against an axial displacement so that they cannot move out of the slots. When it is desired to remove said pins or the tools it will be sufficient to shift the pins and tools to the radially inner end of the slots while the tool carrier is stationary and at said radially inner end the pins will no longer be retained against an axial displacement so that the pins can then be removed. In such toolholders the tools cannot be mounted and removed without an auxiliary implement.

Such a toolholder is known from EP-A1 0 395 624 and has proved satisfactory. In order to ensure that the pins will be retained against an axial displacement in the radially outer portion of the slots, that portion of the slots is covered by sheet metal elements, which are welded to the lugs or to the disks which constitute the tool carrier. Such sheet metal elements add to the expenditure of material and result in an often undesirable increase of the size of the toolholder in the axial direction. Besides, the lugs or disks must be rather thick so that the pin end portions can extend into the slots to a sufficient depth. If the lugs or disks are relatively thin, those portions of the axially spaced apart lugs or disks which are formed with the slots may move apart adjacent to the radially outer ends of the slots so that the pin ends can enter the slots only to a small depth and may move out of the slots and just as the tools may be thrown off by centrifugal force and may then endanger or injure or damage human beings or machines. It will be understood that the use of thick lugs or disks will increase the size of the toolholder in the axial dimension.

From French Patent Specification No. 1,520,653 it is also known that the pins may be fixed to a tool carrier so that the pins protrude upwardly. In that case the tools have circular holes, with which they are fitted on the pins, and are then retained by means of locking bars, which are formed with key-holelike apertures so that the pin ends can first be inserted into the wider portion of the apertures and the bars may then be displaced to a position in which the narrow portion of the apertures is received by a groove formed in the pin end portion. By a central screw the locking bars are then fixed to the tool carrier in that position for locking the tools in the use of that arrangement an implement is required for fixing the tools and for an exchange of tools because the central screw cannot be tightened and loosened without an implement.

In another known design (Published German Application 29 20 244), leaf springs are secured to the underside of a knife-carrying disk and are also formed with a keyholelike aperture for retaining a pivot pin for a knife. The pivot pin is inserted into the wider portion of the aperture and is then displaced toward the narrower portion, in which the edges of the aperture enter a groove in the pin so that the latter is retained. A separate plate is riveted to the leaf spring and serves to lock the pin in that position so that it is difficult to replace a pin. The knife is a friction fit on the pin and an axial displacement of the knife on the pin is prevented in that the leaf spring urges the knife against the underside of the knife-carrying disk. That design also involves a considerable structural expenditure and does not permit a change of a tool without the use of an implement because the leaf spring must be forced away from the knife-carrying disk before the knife can be removed or replaced.

SUMMARY OF THE INVENTION

For this reason it is an object of the invention so to improve the toolholder described first hereinbefore that the tools can be replaced in a simple manner, a detaching of the tools will reliably be prevented even if the lugs or disks are very thin, and material can be saved.

This object is accomplished in accordance with the invention in that each of the two axially spaced apart and axially aligned slots of each pair has a constricted radially outer portion, each end portion of each pin has a diameter that corresponds to the unconstricted width of the slot, the constriction is defined merely by projections, which are formed on the side faces of each slot on that side which is nearer to the other slot of the same pair, and the pins are formed with recessed portions for receiving said projections.

In such a toolholder each end portion of each pin virtually constitutes a head, which is engaged on the inside by the projection formed on the side faces of the slot and because the two associated slots, on the other hand, conform to each other the pin acts like a rivet to hold the lugs or disks together and will reliably be held against an axial displacement without a need for any covering means. There is no constriction in the radially inner portion of the slot so that the pin can be inserted into and removed from that portion in a simple manner and without a need for an implement, as before. A further advantage afforded by the design in accordance with the invention resides in that the ends of the pins need not protrude from the surfaces of the lugs or disks and that the lugs or disks may be very thin because they are held together by the pins so that they cannot move apart.

In a particularly desirable design the projections are formed in that the two axially spaced apart and axially aligned slots are defined by hollow-conical or inclined side face portions and each pin has two conical enlarged end portions. In a different design the pins have a basically cylindrical shape and are formed with groovelike recessed portions for receiving the projections of the slot; in that case the diameter of the pins need not be decreased adjacent to the eyes of the tools. It will be understood that two or more tools consisting, e.g., of knives, air vanes, may be mounted on each pin.

According to a further desirable feature the axial distance between the axially spaced apart lugs or disks increases or decreases radially inwardly along each slot and the lugs or disks are resiliently biased toward each other or away from each other. Because each pin has end portions which protrude over the constrictions of the slots, the face that the distance between the lugs or disks increases in a radially inward direction will prevent an inward movement of the pin to a position from which the pin could detach. The same effect will be achieved when the axial distance between the lugs or disks decreases radially inwardly along the slot and the pin has grooves for receiving the projections in the slots. These features thus provide additional means for preventing a detaching of the pins. It will be understood that the two lugs or disks will have to be forced toward each other or bent apart when a mounting or removal of pins is desired.

BRIEF DESCRIPTION OF THE DRAWINGS

FIGS. 4 and 5 are views which are similar to FIG. 3 and show for two embodiments a pin and the radially outer portions of two slots.

FIG. 6 shows the radially outer portion of each slot is enlarged approximately in a cardioid shape.

DETAILED DESCRIPTION OF THE PREFERRED EMBODIMENTS

Figure 1:
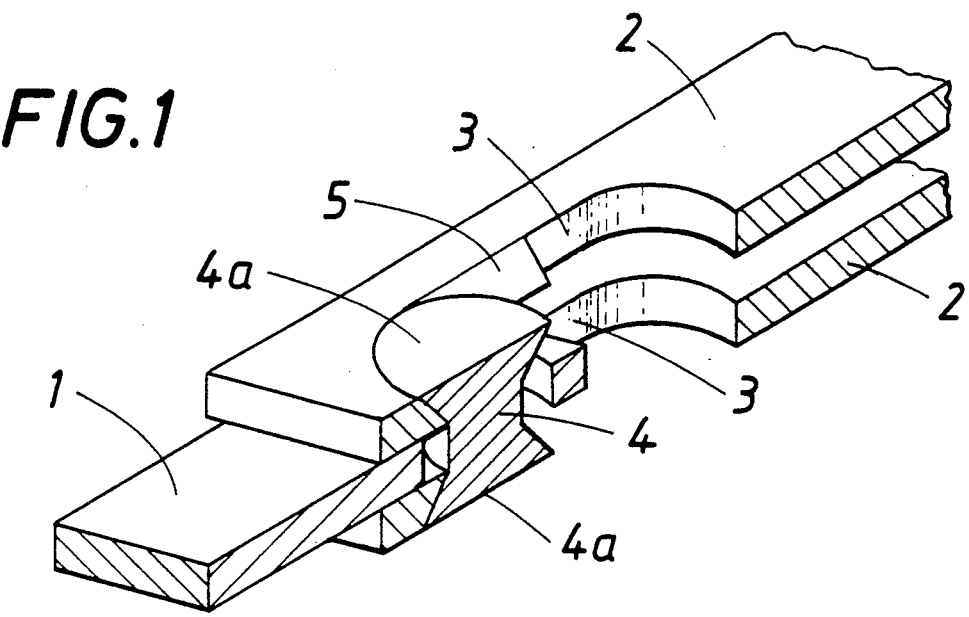
FIG. 1 is a fragmentary perspective sectional view taken on FIG. I—I in FIG. 2 and showing a part of a toolholder.
Figure 2:
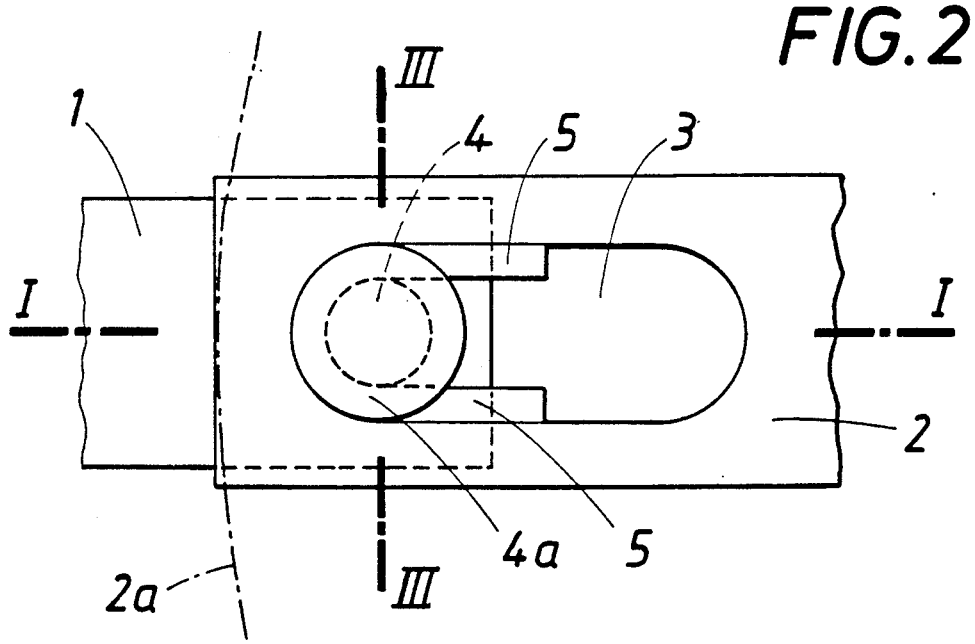
FIG. 2 is a top plan view corresponding to FIG. 1.
Figure 3:
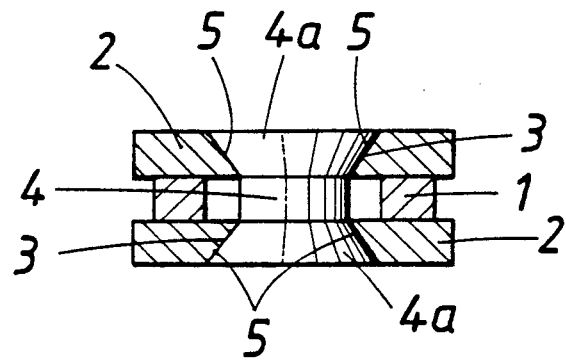
FIG. 3 is a transverse sectional view taken on line III—III in FIG. 2.

A tool consisting e.g., of a knife 1, is held between two axially spaced apart and axially aligned lugs 2, which are secured to and approximately radially outwardly protrude from a rotatably mounted tool carrier body that is not shown. Instead of lugs 2 mounted on a tool carrier body, two axially spaced apart disks 2a may be provided, which constitute a rotatably mounted tool carrier, as is indicated in phantom in FIG. 2. The lugs 2 or disks 2a are formed with slots 3, which extend radially with respect to the axis of rotation of the tool carrier and receive the end portions of a pin 4, which is parallel to said axis of rotation and on which the knives 1 are pivotally mounted. The radially outer portion of each slot 3 is formed on that side which is nearer to the opposite slot with a projection 5, by which the slot 3 is constricted and which is received by a corresponding recessed portion formed in the associated pin 3. In the embodiment shown in FIGS. 1 to 3 each slot 3 is defined by side faces formed with hollow-conical or inclined portions, which constitute the projections 5, and the pin 4 has two enlarged conical end portions 4a. It will be understood that no projections 5 are provided in the radially inner portion of each slot 3 so that the pin 4 can be removed there from the slots 3. In the embodiments shown in FIGS. 4 and 5 the pin 4 has a basically cylindrical shape and is formed with groovelike recessed portions 4b for receiving the projections 5 by which the slots 3 are constricted.

In the embodiment shown in FIG. 6 the radially outer portion 3a of each slot is enlarged approximately in a cardioid shape. It will be understood that enlarged portion has such dimensions that the projections 5 will prevent an axial movement of the pin 4. Owing to the enlarged portion 3a the pin can slightly roll on one or the other of the two oblique boundary surfaces of the enlarged portion 3a in case of a strong impact on the knife so that the impact transmitted to the tool carrier will be weakened.

I claim:

1. In a toolholder for use in a rotary crop-cutting machine, which toolholder comprises
   a tool carrier, which has an axis of rotation and is adapted to be mounted in said machine for rotation about said axis and comprises two axially spaced apart portions, which are formed with a plurality of radially spaced apart pairs of axially spaced apart and axially aligned, radially extending slots, each of which has a radially outer portion, and
   a plurality of pins, each of which is adapted to pivotally mount at least one tool and is radially slidably mounted in the slots of one of said pairs to extend parallel to said axis of rotation and has two mutually opposite end portions,
   wherein means are provided for holding said two end portions of each of said pins in said radially outer portions of said slots of one of said pairs against an axial displacement,
   the improvement residing in that
   said radially outer portion of each of said slots is defined by side faces which on that side which is nearer to the other slot of the same pair are formed with projections, by which said slot is constricted,
   each of said radially outer portion of each of said slots has an unconstricted portion axially outwardly of said projections,
   each of said pins has recessed portions for receiving said projections which constrict the slots of one of said pairs, and
   each of said end portions of said pins has a diameter corresponding to the width of said unconstricted portion of said slot.

2. The improvement set forth in claim 1 as applied to a toolholder for use in a mowing machine.

3. The improvement set forth in claim 1 as applied to a toolholder for use in a chopping machine.

4. The improvement set forth in claim 1 as applied to a toolholder in which said tool carrier comprises a plurality of radially spaced apart pairs of axially spaced apart, radially protruding lugs, each of which is formed with one of said slots.

5. The improvement set forth in claim 1 as applied to a toolholder in which said tool carrier comprises two axially spaced apart disks, which are formed with said slots.

6. The improvement said forth in claim 1, wherein said side faces defining said radially outer portion of each of said slots have hollow-conical portions defining said projections and
   each of said end portions of said pins is conically enlarged.

7. The improvement set forth in claim 1, wherein said side faces defining said radially outer portion of each of said slots have inclined portions defining said projections and
   each of said end portions of said pins is conically enlarged.

8. The improvement set forth in claim 1, wherein each of said pins is generally cylindrical with the exception of grooves, which constitute said recessed portions.

9. The improvement set forth in claim 1, wherein
the axial distance between said axially spaced apart portions of said tool carrier increases along said slots in a radially inward direction and
said axially spaced apart portions of said tool carrier are resiliently biased toward each other.

10. The improvement set forth in claim 1, wherein
the axial distance between said axially spaced apart portions of said tool carrier decreases along said slots in a radially inward direction and
said axially spaced apart portions of said tool carrier are resiliently biased away from each other.

* * * * *